(12) United States Patent
Joo et al.

(10) Patent No.: US 7,144,973 B2
(45) Date of Patent: Dec. 5, 2006

(54) BIAXIALLY ORIENTED, WHITE FLAME-RETARDANT POLYESTER FILM

(75) Inventors: Jae-Suk Joo, Suwon-si (KR); Gwan-Hyung Lee, Suwon-si (KR); Yong-Won Kim, Suwon-si (KR)

(73) Assignee: SKC Limited (KR)

( * ) Notice: Subject to any disclaimer, the term of this patent is extended or adjusted under 35 U.S.C. 154(b) by 50 days.

(21) Appl. No.: 10/970,401

(22) Filed: Oct. 19, 2004

(65) Prior Publication Data

US 2005/0085572 A1   Apr. 21, 2005

(30) Foreign Application Priority Data

Oct. 20, 2003   (KR) ................ 10-2003-0073126

(51) Int. Cl.
*C08G 63/00* (2006.01)
(52) U.S. Cl. ............... 528/272; 264/176.1; 264/219; 428/423.7; 428/430; 428/431; 524/115; 524/138; 524/148; 528/271

(58) Field of Classification Search .......... 264/176.1, 264/219; 428/423.7, 430, 431; 524/115, 524/138, 148; 528/271, 272
See application file for complete search history.

(56) References Cited

U.S. PATENT DOCUMENTS

| 5,403,879 A * | 4/1995 | Kim et al. ............. 524/161 |
| 2003/0049472 A1 * | 3/2003 | Murschall et al. ......... 428/480 |
| 2004/0198878 A1 * | 10/2004 | Kakegawa et al. ........ 524/115 |

* cited by examiner

*Primary Examiner*—Terressa Boykin
(74) *Attorney, Agent, or Firm*—Anderson Kill & Olick, PC

(57) ABSTRACT

The biaxially oriented, white polyester film of the present invention having improved flame-retardancy, covering ability, flexibility and heat-resistance comprises a polyester resin having an intrinsic viscosity of 0.4 to 0.9 dl/g, a flame-retardant which is alkylene bistetrabromophthalimide or decabromodiphenylalkane, and a fluorescent whitening agent, said polyester film being biaxially drawn at a total draw ratio of 9 or more.

7 Claims, No Drawings

BIAXIALLY ORIENTED, WHITE FLAME-RETARDANT POLYESTER FILM

FIELD OF THE INVENTION

The present invention is directed to a biaxially oriented white polyester film having improved flame-retardancy, covering ability, flexibility and heat-resistance.

BACKGROUND OF THE INVENTION

White flame-retardant films are widely used for cable coating, print material, label, interior decoration, timber lamination and the like, and polyvinyl chloride, polyester and polypropylene films have been usually used in such applications. Polyvinyl chloride films having an added flame-retardant, however, cause the problem of generating toxic gases on combustion. In case of polyester and polypropylene films, olefin or styrene-based resins are frequently mixed therewith in order to enhance covering ability and flexibility, which results in lowering of the flame-retardancy and heat-resistance.

SUMMARY OF THE INVENTION

Accordingly, it is an object of the present invention to provide a white polyester film having improved flame-retardancy, covering ability (the ability to visibly shield substrate), flexibility and heat-resistance.

In accordance with the present invention, there is provided a biaxially oriented, white flame-retardant polyester film which comprises: a polyester resin having an intrinsic viscosity of 0.4 to 0.9 dl/g which is composed of: 60% by weight or more of ethylene terephthalate repeating units; a flame-retardant which is alkylene bistetrabromophthalimide or decabromodiphenylalkane in an amount ranging from 5 to 18% by weight based on the weight of the resin; and a fluorescent whitening agent in an amount ranging from 0.04 to 0.2% by weight based on the weight of the resin, said film being drawn at a total draw ratio (the sum of the longitudinal draw ratio and transverse draw ratio) of 9 or more.

DETAILED DESCRIPTION OF THE INVENTION

The biaxially oriented, white polyester film according to the present invention is characterized in that it is prepared by adding an alkylene bistetrabromophthalimide or decabromodiphenylalkane flame-retardant to a polyester resin and then biaxially drawing the polyester sheet at a total draw ratio of 9 or more.

The polyester resin which is employed in the present invention contains at least 60% by weight of ethylene terephthalate repeating units, and may be prepared by polymerizing a dicarboxylic acid component such as dimethyl terephthalate and a diol component such as ethylene glycol. It is desired that the polyester resin in accordance with the present invention has an intrinsic viscosity of 0.4 to 0.9 dl/g, preferably 0.5 to 0.8 dl/g (measured at 35° C. using a 0.3 g sample dissolved in 25 ml of ortho-chlorophenol). When its intrinsic viscosity is less than 0.4 dl/g, frequent breakages occur during the drawing process and the film product's mechanical strength becomes poor. When it is greater than 0.9 dl/g, the shear stress increases to cause poor processibility.

In accordance with the present invention, an alkylene bistetrabromophthalimide or decabromodiphenylalkane flame-retardant is added to the afore-mentioned polyester resin in an amount ranging from 5 to 18% by weight based on the weight of the resin. When the amount of said flame-retardant is less than 5% by weight, the desired flame-retardancy is not achieved. When it is greater than 18% by weight, the film's processibility becomes poor.

Further, in order to better enhance the flame-retardancy, a flame-retardancy enhancing agent may be optionally used in combination with said flame-retardant in an amount ranging from 1 to 9% by weight based on the weight of the resin, and examples thereof include antimony trioxide and zinc sulfide.

In accordance with the present invention, a fluorescent whitening agent which acts to absorb a ultraviolet ray and emit a visible ray (reflexibility), preferably a 400 to 500 nm wavelength visible ray, to enhance the covering ability, is added to the polyester resin in an amount ranging from 0.04 to 0.2% by weight based on the weight of the resin. A preferable fluorescent whitening agent that may be used in the present invention is a bisbenzoazole compound which has a reflexibility of 75% or more at 440 nm. When the amount thereof is less than 0.04% by weight, the desired reflexibility at 440 nm is not obtained, and when greater than 0.2% by weight, the film's heat-resistance and mechanical property become poor.

The flame-retardant, optional flame-retardancy enhancing agent and fluorescent whitening agent may be added to an ethylene glycol slurry before the polymerization process, or added to a polyester using chips of a masterbatch.

The inventive polyester film may be prepared by melt-extruding a polyester resin composition comprising said additives using a T-die or inflation method to form an undrawn polyester sheet and biaxially drawing the undrawn sheet, followed by heat-setting.

In accordance with the present invention, the undrawn polyester sheet is biaxially drawn at a total draw ratio (the sum of the longitudinal draw ratio and transverse draw ratio) of 9 or more, preferably in the longitudinal direction at a draw ratio of 2.5 or more and in the transverse direction at a draw ratio of 2.5 or more, at a temperature ranging from 90 to 140° C. The biaxially drawn film may be heat-set at a temperature ranging from 200 to 240° C.

The inventive biaxially oriented polyester film may have a thickness ranging from 15 to 300 μm and may further comprise an interesterification catalyst, polycondensation catalyst, dispersant, stabilizer and other additives. If necessary, the inventive polyester film may be further surface-treated, e.g., corona discharging-treated, and it may be coated, laminated or co-extruded with other resins.

The polyester film in accordance with the present invention has improved flame-retardancy, covering ability, flexibility, heat-resistance and coating conformity, and it can be advantageously used for cable coating, print material, label, interior decoration, timber lamination and other applications.

The present invention is further described and illustrated in Examples, which are, however, not intended to limit the scope of the present invention.

The polyester films manufactured in Examples and Comparative Examples were examined for the following properties.

(1) Limited Oxygen Index (L.O.I.)

The limited oxygen index of a film was measured by the ASTM D2863 method using a limited oxygen index measuring instrument which is commercially available from FTT Company.

(2) UL 94 Test (Flame-retardancy)

The flame-retardancy of a film was determined by vertically placing the film and lighting it.

V-2: the fire goes out in 60 seconds after the start, and C.I. (Cotton Ignition: the phenomenon that a spark generated by the ignited film causes a cotton sample positioned at 30 cm below to catch fire) is permitted.

V-1: the fire goes out in 60 seconds after the start, and C.I. is not permitted.

V-0: the fire goes out in 30 seconds after the start, and C.I. is not permitted.

(3) Heat-resistant Strength

The heat-resistant strength of a film was measured by the ASTM D882 method before and after the aging at 170° C. during a period of 8 hrs.

(4) Light Transmittance (Covering Ability)

The light transmittance of a film was measured by the ASTM D1003 method (diameter: 25 mm, dispersion angle: 2.5°).

(5) Density (Flexibility)

The density of a film was determined using a density gradient column.

(6) Surface Tension (Coating Conformity)

The surface tension of a film was determined using a standard reagent for measuring surface tension.

EXAMPLE 1

Dimethyl terephthalate and ethylene glycol were mixed in an equivalent ratio of 1:2, and a calcium acetate monohydrate (an interesterification catalyst) was added thereto in an amount of 0.05% by weight based on the weight of dimethyl terephthalate and was kept at 200° C. for 180 min. After the interesterification was completed, trimethylphosphate (a stabilizer) and antimony trioxide (a polymerization catalyst) were added to the reaction mixture in amounts of 0.05% and 0.04% by weight, respectively, based on the weight of dimethyl terephthalate. The mixture was kept at 280° C. for 180 min, to obtain a polyester resin having an intrinsic viscosity of 0.640 dl/g.

Ethylene bistetrabromophthalimide (a flame-retardant) and 4,4'-bis(2-benzoxazolyl)stylbene (a fluorescent whitening agent) were added to the polyester resin in amounts of 9% and 0.2% by weight, respectively, based on the weight of the polyester resin, and mixed at 285° C. using a compounder screw at a rotation rate of 300 rpm, to prepare a polyester resin composition.

The polyester resin composition was melt-extruded at 280° C. through a conventional T-die and cooled by a casting roller maintained at 25° C., to obtain a sheet. The sheet was drawn at a draw ratio of 3 in the longitudinal direction at 95° C., and then, drawn at a draw ratio of 3 in the transverse direction at 120° C., followed by heat-setting at 220° C., to obtain a 100 micron thick biaxially drawn polyester film.

The properties of the resulting biaxially drawn polyester film in terms of L.O.I., UL 94 test, heat-resistant strength, light transmittance, density and surface tension are shown in Table 1.

EXAMPLE 2

The procedure of Example 1 was repeated except that antimony trioxide (a flame-retardancy enhancing agent) was further added to the polyester resin in an amount of 3% by weight based on the weight of the polyester resin, to obtain a 100 micron thick biaxially drawn polyester film, whose properties are listed in Table 1.

EXAMPLE 3

The procedure of Example 1 was repeated except that zinc sulfide (a flame-retardancy enhancing agent) was further added to the polyester resin in an amount of 3% by weight based on the weight of the polyester resin, to obtain a 100 micron thick biaxially drawn polyester film, whose properties are listed in Table 1.

EXAMPLES 4 AND 5, AND COMPARATIVE EXAMPLES 1 AND 2

The procedure of Example 1 was repeated employing the specifics shown in Table 1, to obtain various biaxially drawn films, whose properties are listed in Table 1.

COMPARATIVE EXAMPLE 3

The procedure of Example 1 was repeated except that decabromodiphenyl oxide (a flame-retardant) instead of ethylene bistetrabromophthalimide and polypropylene resin were added to the polyester resin in amounts of 9% and 10% by weight, respectively, based on the weight of the polyester resin, to obtain a 100 micron thick biaxially drawn polyester film, whose properties are listed in Table 1.

TABLE 1

| | | | | | | | Properties of the film | | | | | |
| --- | --- | --- | --- | --- | --- | --- | --- | --- | --- | --- | --- | --- |
| | Additives | | | | Draw ratio | | | | | | Heat-resistant strength (kg/mm$^2$) | |
| Ex. No. | Kind | Amount (wt %) | Kind | Amount (wt %) | (L × T) | UL 94 test | L.O.I. (wt %) | Transmittance (%) | Surface Tension (dyne/cm) | Density (g/cm$^3$) | Before aging | After aging |
| 1 | (A) | 9 | — | — | 3 × 3 | V-0 | 33 | 8 | 43 | 1.20 | 20 | 18 |
| 2 | (A) | 9 | (B) | 3 | 3 × 3 | V-0 | 35 | 4 | 44 | 1.24 | 20 | 18 |
| 3 | (A) | 9 | (C) | 3 | 3 × 3 | V-0 | 35 | 4 | 44 | 1.23 | 20 | 18 |
| 4 | (A) | 9 | — | — | 4 × 4 | V-0 | 33 | 6 | 43 | 1.15 | 22 | 21 |
| 5 | (D) | 9 | — | — | 3 × 3 | V-0 | 34 | 6 | 43 | 1.16 | 21 | 19 |
| Com. Ex. 1 | (A) | 4 | — | — | 3 × 3 | V-2 | 25 | 20 | 43 | 1.38 | 21 | 18 |

TABLE 1-continued

| | Additives | | | Draw ratio | Properties of the film | | | | | | |
|---|---|---|---|---|---|---|---|---|---|---|---|
| | | | | | | | | | | Heat-resistant strength (kg/mm²) | |
| Ex. No. | Kind | Amount (wt %) | Kind | Amount (wt %) | (L × T) | UL 94 test | L.O.I. (wt %) | Transmittance (%) | Surface Tension (dyne/cm) | Density (g/cm³) | Before aging | After aging |
| Com. Ex. 2 | (A) | 9 | — | — | 2.5 × 2.5 | V-0 | 32 | 15 | 43 | 1.33 | 18 | 16 |
| Com. Ex. 3 | (E) | 9 | (F) | 10 | 3 × 3 | V-2 | 26 | 6 | 35 | 1.17 | 20 | 13 |

(A) Ehylene bistetrabromophthalimide
(B) Atimony trioxide
(C) Zinc sulfide
(D) Decabromodiphenylethane
(E) Decabromodiphenyl oxide
(F) Polypropylene As shown in Table 1, the films of Examples 1 through 5 show improved properties in terms of flame-retardancy, covering ability, flexibility, heat-resistance, coating conformity and the like, as compared with those of Comparative Examples 1 through 3. These results confirm that the density and surface tension of the film of Examples 1 to 5 are in ranges of 1.00 to 1.25 g/cm³ and at least 43 dyne/cm, respectively.

Thus, the inventive oriented polyester film has improved flame-retardancy, covering ability, flexibility, heat-resistance and coating conformity, and it can be advantageously used for cable coating, print material, label, interior decoration, timber lamination and other applications.

While the invention has been described with respect to the above specific embodiments, it should be recognized that various modifications and changes may be made to the invention by those skilled in the art which also fall within the scope of the invention as defined by the appended claims.

What is claimed is:

1. A biaxially oriented, white flame-retardant polyester film which comprises:
    (A) a polyester resin having an intrinsic viscosity of 0.4 to 0.9 dl/g which is composed of 60% by weight or more of ethylene terephthalate repeating units;
    (B) a flame-retardant which is alkylene bistetrabromophthalimide or decabromodiphenylalkane in an amount ranging from 5 to 18% by weight based on the weight of the resin; and
    (C) a fluorescent whitening agent in an amount ranging from 0.04 to 0.2% by weight based on the weight of the resin,
    said film being drawn at a total draw ratio (the sum of the longitudinal draw ratio and transverse draw ratio) of 9 or more.

2. The polyester film of claim 1, wherein the fluorescent whitening agent is a bisbenzoazole compound.

3. The polyester film of claim 1, which further comprises a flame-retardancy enhancing agent in an amount ranging from 1 to 9% by weight based on the weight of the resin.

4. The polyester film of claim 3, wherein the flame-retardancy enhancing agent is antimony trioxide or zinc sulfide.

5. The polyester film of claim 1, which is drawn in the longitudinal direction at a draw ratio of 2.5 or more and in the transverse direction at a draw ratio of 2.5 or more, at a temperature ranging from 90 to 140° C.

6. The polyester film of claim 1, which is heat-set at a temperature ranging from 200 to 240° C.

7. The polyester film of claim 1, which has a density of 1.00 to 1.25 g/cm³ and a surface tension of at least 43 dyne/cm.

* * * * *